United States Patent
Eagle et al.

(10) Patent No.: US 6,361,092 B1
(45) Date of Patent: Mar. 26, 2002

(54) AUTOMOTIVE FRAME BUMPER INTERFACE FOR DISCRIMINATED DECELERATION RESPONSE

(75) Inventors: Paul J Eagle, Bloomfield Hills; James A Cotton, Royal Oak; Anne Ridenour, Dearborn Heights; Sherry A Feldpausch, Clarkston; Patrick J Gibbons, Royal Oak; Jason D Shawver, Waterford; Kristin Godfrey, Roseville, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/711,570

(22) Filed: Nov. 13, 2000

(51) Int. Cl.[7] .............................................. B60R 19/02
(52) U.S. Cl. ........................ 293/102; 293/189; 293/120; 293/121; 188/377; 188/371
(58) Field of Search ................................ 293/102, 120, 293/121; 296/183; 188/377, 371

(56) References Cited

U.S. PATENT DOCUMENTS

| | | | |
|---|---|---|---|
| 3,697,108 A | * 10/1972 | Diener | 293/89 |
| 3,930,665 A | 1/1976 | Ikawa | |
| 3,997,208 A | * 12/1976 | Nimiyma | 293/71 |
| 4,272,114 A | 6/1981 | Hirano et al. | |
| 4,413,856 A | 11/1983 | McMahan et al. | |
| 4,449,603 A | * 5/1984 | Langwieder et al. | 296/189 |
| 5,269,574 A | 12/1993 | Bhutani et al. | |
| 5,306,058 A | * 4/1994 | Sturrus et al. | 293/102 |
| 5,314,229 A | 5/1994 | Matuzawa et al. | |
| 5,547,309 A | * 8/1996 | Mak et al. | 404/6 |
| 5,727,827 A | * 3/1998 | Shibuya et al. | 293/155 |
| 5,732,801 A | 3/1998 | Gertz | |
| 5,785,367 A | 7/1998 | Baumann et al. | |
| 5,799,991 A | * 9/1998 | Glance | 293/121 |
| 5,876,077 A | 3/1999 | Miskech et al. | |
| 5,876,078 A | 3/1999 | Miskech et al. | |
| 6,000,738 A | 12/1999 | Stewart et al. | |
| 6,003,912 A | * 12/1999 | Schonhoff et al. | |
| 6,003,930 A | 12/1999 | Frank et al. | |
| 6,009,970 A | 1/2000 | Breed | |
| 6,059,331 A | 5/2000 | Mori | |
| 6,174,009 B1 | * 1/2001 | Mckeon | 188/377 |
| 6,179,320 B1 | * 1/2001 | Chou et al. | 280/500 |
| 6,227,582 B1 | * 5/2001 | Ichien | 293/132 |

* cited by examiner

Primary Examiner—Joseph D. Pape
Assistant Examiner—Kiran B. Patel
(74) Attorney, Agent, or Firm—Mark P. Calcaterra

(57) ABSTRACT

An arrangement of a frame rail bumper beam combination is provided which has a frame rail for connection with a chassis of an automotive vehicle, and a bumper beam having a tubular cross-sectional shape with a first section connected with the frame rail, and a first upper surface between a front end and a rear end of the bumper beam, and the bumper beam having at least first and second cutouts in the first surface with a web therebetween that causes the rail to plastically deform in the first section of the bumper beam in a crash.

6 Claims, 3 Drawing Sheets

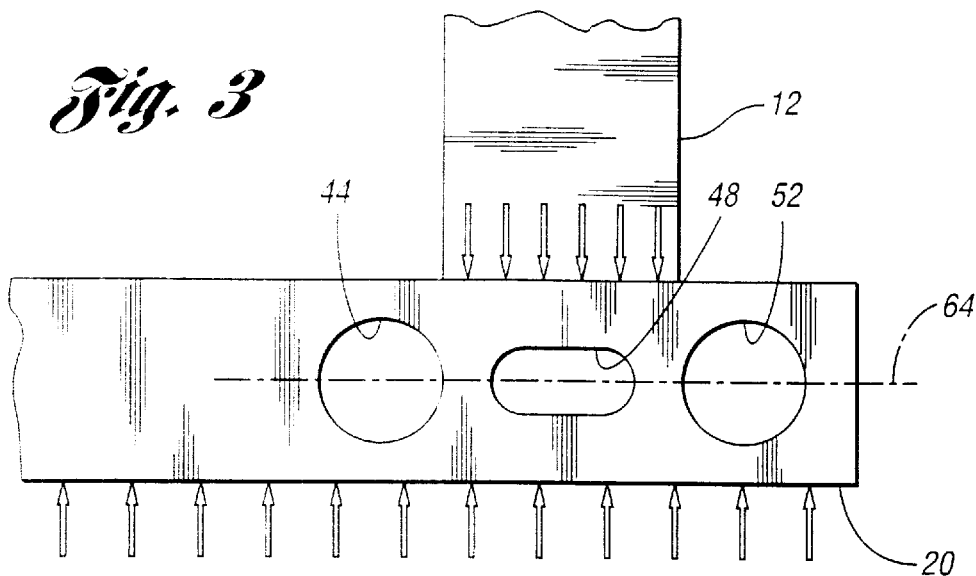
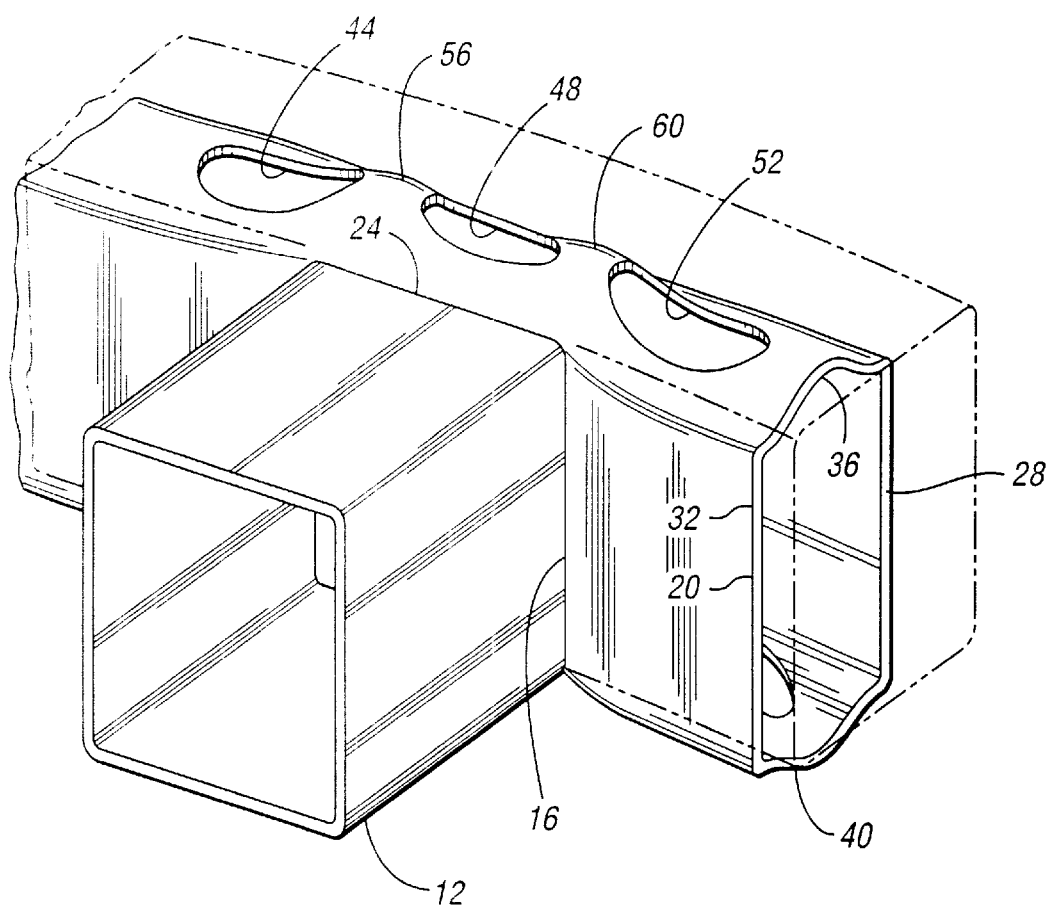

AUTOMOTIVE FRAME BUMPER INTERFACE FOR DISCRIMINATED DECELERATION RESPONSE

FIELD OF THE INVENTION

The field of the present invention is frame rail and bumper beam combinations for automotive vehicles. More particularly, the field of the present invention relates to an arrangement of a frame rail and bumper beam combination for an automotive vehicle wherein in a frontal crash the bumper beam will deform in a manner to provide a predetermined deceleration response.

BACKGROUND OF THE INVENTION

Providing bumpers on the front end of automotive vehicles is well known. Bumpers were initially provided on the front end of vehicles to reduce damage from frontal collisions. In subsequent years, the protection afforded by the bumper to the vehicle was diminished in favor of utilizing the bumper to add to the aesthetics of the vehicle. In response to the diminished crash protection previously afforded by many bumpers, federal regulations were promulgated to provide for bumpers to meet certain minimum crash worthiness standards in relatively low speed crashes.

It was initially thought that a vehicle must be made as structurally sound as possible to maximize the protection to occupants in a frontal crash. Over a period of time it was discovered that in crashes, structural rigidity alone did not maximize vehicle occupant safety. For maximum protection in frontal crashes not only must there be high strength, but the bumper must deform in such a manner to minimize the amount of deceleration experienced by the vehicle occupant. Automotive designers now incorporate bumpers and the attached frame rails as part of the total safety system in the vehicle.

In the most recent two decades passive restraint systems have been added to automotive vehicles to further protect occupants in frontal collisions. The most widely accepted passive restraint system for front seat occupants is the supplemental inflation restraint (SIR), commonly referred to as an air bag. In a SIR system, accelerometers or other kinematic sensors, are placed on the vehicle to provide a signal to an inflator device when certain predetermined deceleration conditions are experienced. In a frontal crash, the signal will initiate a gas generating or gas dispensing reaction, which rapidly inflates a fabric envelope that cushions rapid forward movement of a front seat occupant, thereby limiting the deceleration of the front seat occupant. Deployment of SIRs in automotive vehicles has substantially reduced fatalities and serious injuries to vehicle occupants. However, installation of SIRs in automotive vehicles has further complicated the design criteria for automotive bumpers.

Automotive bumpers are designed in accordance with government regulations to minimize damage to the vehicle in low speed collisions. Automotive bumpers must also be designed to contribute to the safety of vehicle occupants by being part of the total energy absorption of the vehicle front end in a crash. It is desirable to provide an automotive bumper that meets the above criteria and has a discriminated deceleration response in low and high speed vehicle crashes.

In a low speed crash, it is desirable that the SIR system not deploy. Therefore, to prevent deployment of the SIR, the deceleration response given to the accelerometer must be such that the accelerometer can properly discriminate it from a high speed collision deceleration response.

In a high speed crash, it is desirable for the SIR to deploy. Therefore, the deceleration response from the bumper to the accelerometer must allow the accelerometer to discriminate it from a low speed deceleration response in order to signal the inflator to operate.

The bumper must be strong enough to prevent damage to functioning components such as headlamps and hood latches in a low speed crash situation.

It is desirable to provide a front bumper which, in a low speed crash will deform in a manner to prevent the accelerometer from experiencing a high deceleration response in order to prevent subsequent SIR deployment.

SUMMARY OF THE INVENTION

To make manifest the above noted and other manifold desires, the revelation of the present invention is brought forth. The present invention provides the freedom of an automotive bumper with appropriate high strength characteristics in low speed crashes while at the same time having a predetermined deformation which allows discrimination in the deceleration response experienced by an accelerometer on a vehicle equipped with an SIR system.

The present inventive arrangement is not bound by a specific means of connection of the frame rail to the bumper beam, but can encompass various connective schemes.

In a preferred embodiment the present inventive arrangement provides a frame rail for connection with the remainder of the chassis of the automotive vehicle. The frame rail extends in a generally longitudinal direction from the chassis. A bumper beam is provided having a tubular cross-sectional shape. The bumper beam has a first section connected with the frame rail. First upper and second lower surfaces extend between the front and rear ends of the bumper beam. The first and second surfaces have vertically and laterally aligned first, second and third cutouts. The outer cutouts are generally circular and have an axis that extends along the neutral axis of the bumper beam, which essentially intersects the centroid of the bumper cross section. The cutouts allow the bumper beam to plastically deform in a frontal direction.

In a very low speed crash, the structural integrity of the bumper beam is essentially unabated. In a crash with a change in velocity below the no-deploy threshold of the SIR, the bumper beam will deform in such a manner to provide a deceleration response to an accelerometer which will signal the inflator device to not deploy the SIR system.

In a higher speed frontal collision the frame rail bumper beam arrangement will provide a deceleration response of sufficient magnitude in a sufficiently short time interval to allow the accelerometer to signal the inflator device to operate.

The sizes and relative positions of the cutouts improve the discrimination of high speed crashes with obstacles which are relatively compliant during the early part of a crash, but become more rigid as the crash progresses and the vehicle slows down. This type of phenomena is evident during frontal crashes between vehicles and during crashes with deformable barriers such as those used in certain vehicle performance tests. High speed collisions with deformable objects can create deceleration responses which may be less severe than those with rigid objects at low speeds during the early interval of a crash. Low speed crashes with rigid objects are often used to establish the no-deploy threshold of a SIR. Therefore, certain classes of high speed crashes may not result in SIR deployment until late in the event. Such circumstances may result in diminished protection to vehicle occupants.

It is a feature of the present invention to provide a frame rail bumper arrangement wherein the deceleration response of the bumper beam in a frontal crash is such that an accelerometer can discriminate between low speed and high speed crashes.

It is another feature of the present invention to provide a frame rail bumper beam arrangement as described above wherein the bumper beam has sufficient strength to protect the vehicle from damage in very low speed crashes.

The above noted features and other advantages of the present invention will become apparent to those skilled in the art as the invention is further explained in the accompanying drawings and detailed description.

BRIEF DESCRIPTION OF THE DRAWINGS

FIG. 3 is a top schematic view of the bumper beam and frame rail arrangement as shown in FIG. 1 under loads resulting from a frontal crash.

FIG. 4 is a perspective view illustrating deformation of the bumper beam in a frontal crash.

DETAILED DESCRIPTION OF THE INVENTION

Figure 1:
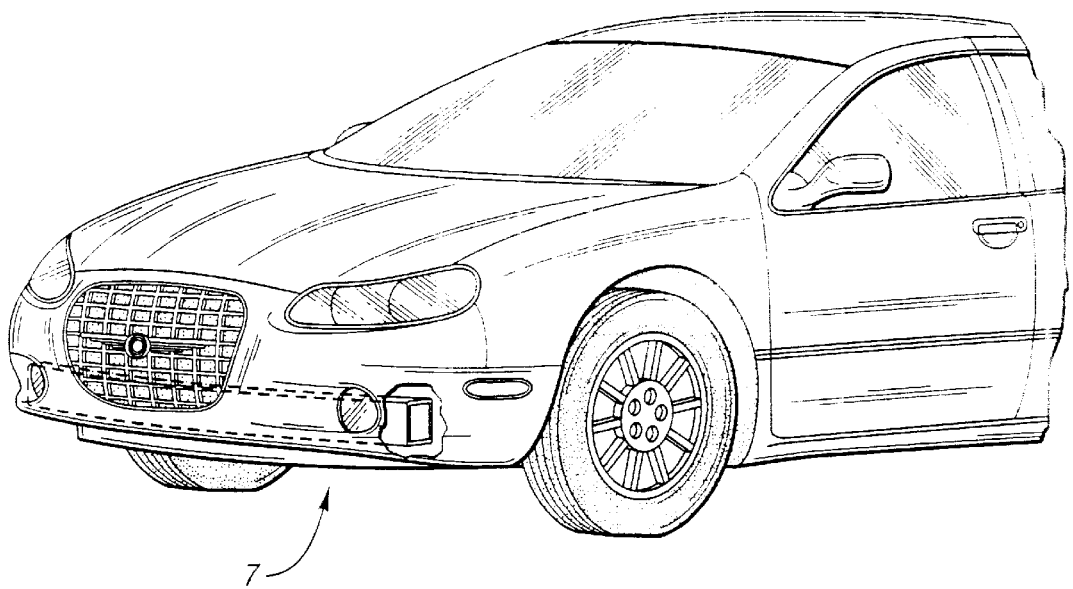
FIG. 1 is a schematic perspective view of the front end of an automobile illustrating the location of a bumper beam underneath a flexible exterior bumper cover.
Figure 2:
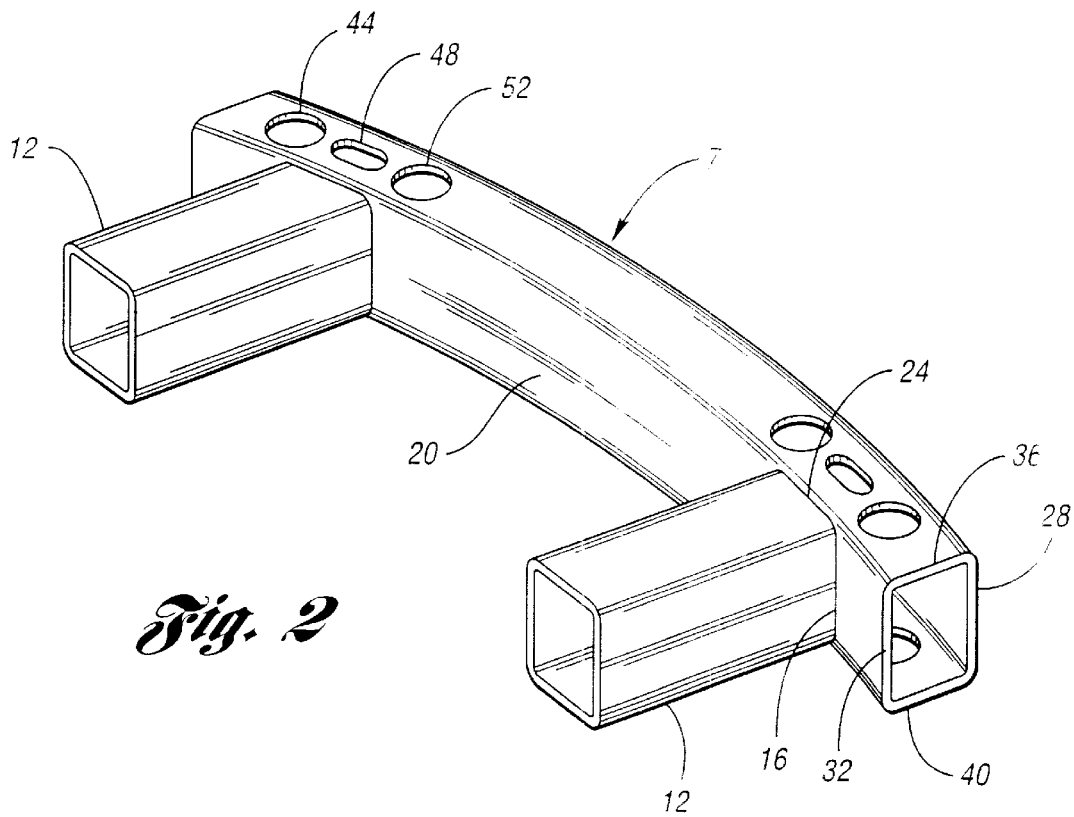
FIG. 2 is a schematic perspective view of a preferred embodiment arrangement of a frame rail and bumper beam according to the present invention.

Referring to FIGS. 1 through 4, the frame rail bumper beam arrangement 7 according to the present invention has a pair of frame rails 12. The frame rails 12 may be of several different configurations and in the example shown are provided by rectangular tubular members. However the present invention is not limited to tubular frame rails. The frame rails 12 are connected with the remainder of the vehicle chassis extending generally longitudinally therefrom. Along a front end 16 of the frame rail there is connected a bumper beam 20. The bumper beam 20 has a first section 24 that is connected by welding or by fasteners to the frame rail 12. The bumper beam 20 has a generally tubular shape. In the illustration shown the bumper beam 20 has a simple rectangular cross-sectional shape. However in many applications a more complex shape can be found, such as that in U.S. Pat. No. 5,306,058. Although shown hollow, the bumper beam 20 can have certain sections filled with a polymeric foam energy absorption material. Between the frame rails 12 the bumper beam can have a slight arcuate shape. The bumper beam 20 has a front end 28 and a rear end 32. Extending between the front and rear ends 28, 32 is a first upper surface 36 which may be planar or curved. Vertically separate from the first upper surface is a second lower surface 40 which also extends between the front and rear ends 28, 32.

The first surface 36 has three cutouts (alternately called "softening holes") 44, 48, 52. Cutouts 44, 48 form between themselves a web 56. Cutouts 48, 52 form between themselves a web 60. The outboard and inboard surfaces of webs 56, 60 extend in a direction generally intersecting with the frame rail 12. Vertically and laterally aligned with the cutouts 44, 48, 52, are similar cutouts on the second lower surface 40. The axis of the cutouts is aligned with the neutral axis 64 of the bumper beam for bending about an axis perpendicular to both the longitudinal and transverse axes of the vehicle. The neutral axis 64 is determined by a vertical plane which intersects the centroid of the bumper beam 20.

The impact behavior of the bumper beam 20 is shown in FIGS. 3 and 4. The impact force is shown as an idealized uniformly distributed load. The bumper beam 20 is shown straightened out due to the bending stress resulting from the frontal impact load. The reaction of the impact load is shown resulting from the frame rail 12. The webs 56, 60 located between cutout 48 and inboard and outboard cutouts 44, 52 are loaded in compression. The width of the center cutout 48 determines the sizes of the webs 56, 60 and the resulting crush strength of the bumper beam. The size of the inboard and outboard cutouts 44, 52 determines the extent of crushing of the inner and outer section of the bumper beam 20 (relative to the frame rail 12) and determines the strength of the bumper beam in corner impacts. The inboard and outboard edges of the webs 56, 60 are aligned with the frame rail edges to concentrate the reaction from the frame rails onto the webs in order to deform them during impact.

Figure 5:
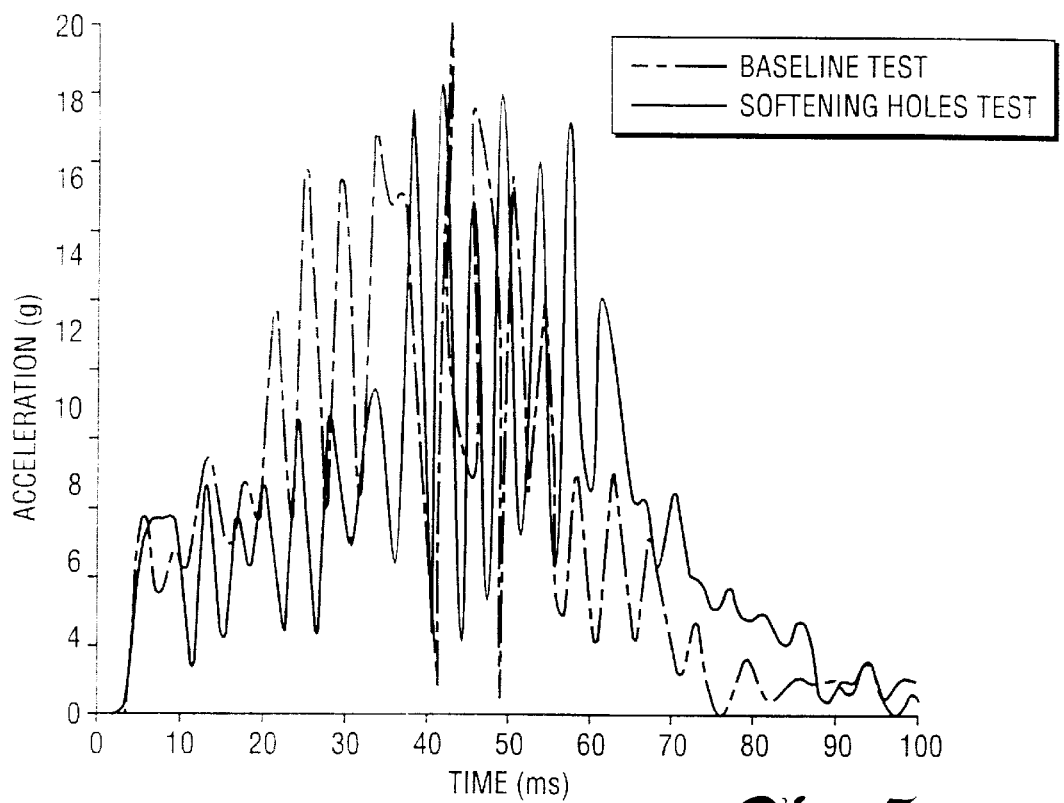
FIG. 5 is a graph illustrating the relationship between acceleration and time for a low speed impact with a 300 Hz filter. This condition represents the no-deploy threshold for the SIR.
Figure 6:
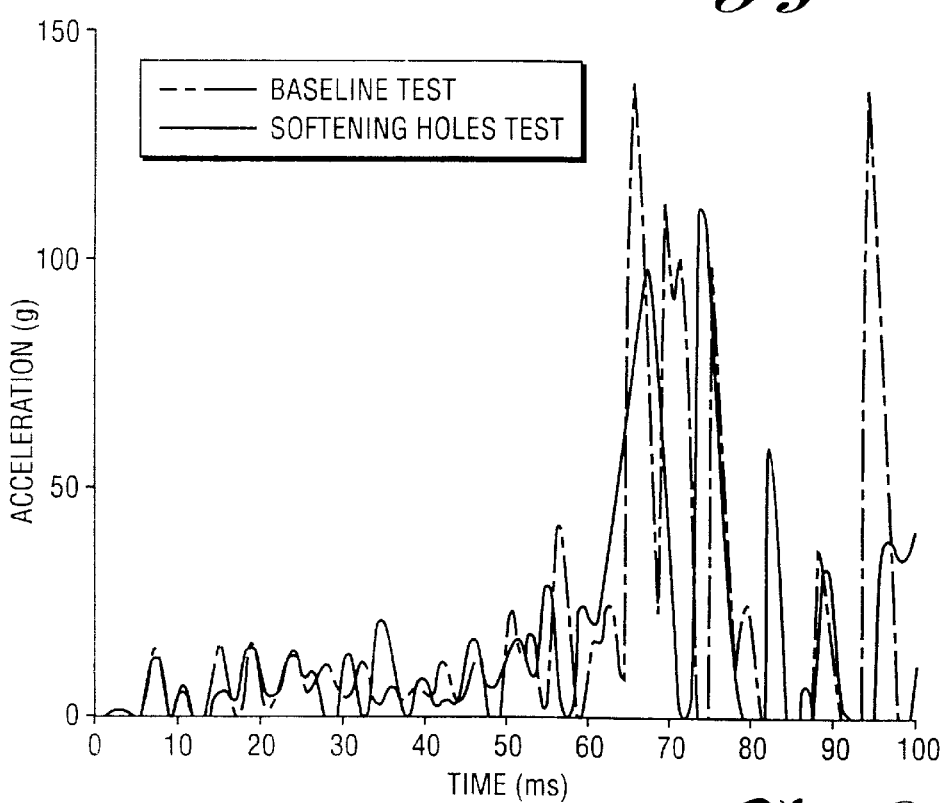
FIG. 6 is a graph similar to that of FIG. 5 illustrating a forty mile per hour offset deformable barrier impact.

The results of applying the softening holes to a bumper beam are shown in FIGS. 5 and 6. Two acceleration time curves are shown in FIG. 5 for low speed impacts generally used to establish the no-deploy threshold for the SIR. The acceleration has been filtered at 300 Hz to limit the noise and show a better representation of the vehicle motion. The baseline test has no holes. The baseline test has relatively high acceleration in the 20–35 millisecond time period. The other curve shows the response of the same vehicle with a beam that has softening holes. The curves are almost identical in terms of acceleration magnitudes for the first 12 milliseconds. This is due to the limited affect of the holes on bending behavior since they lie near the unstressed neutral axis of the beam. This is important to preserve bumper strength in very low speed impacts (i.e., contacting a wall while parking in a parking structure). It is also important since it causes a high enough acceleration response early in the impact to initiate the monitoring by the air bag sensor algorithm. Later in the impact (15–35 milliseconds), the beam crushes in front of the rails, reducing the acceleration response. This allows discrimination between this low-speed impact and some classes of high-speed impacts (i.e., deformable object collisions which densify later in the crash event) where the acceleration magnitude is relatively low in the early part of the event.

Two acceleration time curves are shown in FIG. 6 for a particular class of high speed impact. These results correspond to the acceleration caused by impact of a vehicle with an offset deformable barrier. This impact barrier is comprised of an aluminum honeycomb material attached to a rigid surface. The vehicle strikes the aluminum honeycomb. The aluminum honeycomb crushes with relatively little force until the vehicle reacts against the rigid back barrier. The vehicle strikes the barrier in an offset condition where only 40% of the vehicle's front end strikes the barrier. This test condition is typically used as one measure of vehicle crash performance. The acceleration has been filtered at 300 Hz to limit the noise and show a better representation of the vehicle motion. The baseline test has no softening holes. Both the baseline test and the test using a bumper with softening holes have relatively low acceleration in the 0–55 millisecond time period. This is due to the limited energy absorption of the aluminum honeycomb. The vehicle is not slowed significantly by this initial phase of impact. Later in the event (in this example, 55–65 milliseconds), the vehicle engages the rigid back of the barrier which results in a significantly higher deceleration. The early portion of the acceleration signal is lower in amplitude than the no-deploy threshold for the baseline condition shown in FIG. 5. The softening holes reduce the amplitude of the no-deploy threshold making it possible to discriminate the offset deformable barrier test from a no-deploy threshold test.

The present invention has been shown in a preferred embodiment. However, it will be apparent to those skilled in the art that various modifications can be made to the invention without departing from the spirit or scope of the invention as it is encompassed in the following claims.

We claim:

1. An arrangement of a frame rail bumper beam combination comprising:

a frame rail for connection with a chassis of an automotive vehicle, said frame rail extending generally longitudinally from said chassis;

a bumper beam having a tubular cross-sectional shape with a first section connected with said frame rail, said bumper beam having a first upper surface between a front end and a rear end of said bumper beam, and said bumper beam having at least first and second cutouts in said first surface with a web therebetween extending in a direction generally intersecting said frame rail, said cutouts causing said rail to plastically deform in said first section of said bumper beam in a crash in said front end of said bumper beam.

2. An arrangement of a frame rail bumper beam combination as described in claim 1, wherein said bumper beam has a second lower surface between said front and rear ends of said bumper beam and said second surface has cutouts vertically aligned with said cutouts of said first upper surface.

3. An arrangement of a frame rail bumper beam combination as described in claim 2, wherein said cutouts of said second lower surface are laterally aligned with said cutouts of said first upper surface.

4. An arrangement of a frame rail bumper beam combination as described in claim 1, wherein said cutouts have an axis generally aligned with a neutral axis of said bumper beam.

5. An arrangement of a frame rail bumper beam combination as described in claim 1, wherein said first surface has at least three cutouts with two webs.

6. An arrangement of a frame rail bumper beam combination comprising:

a frame rail for connection with a chassis of an automotive vehicle, said frame rail extending generally longitudinally from said chassis;

a bumper beam having a tubular cross-sectional shape with a first section connected with said frame rail, said bumper beam having first upper and second lower vertically spaced surfaces extending between front and rear ends of said bumper beam, said first upper and second lower surfaces having first and second outer cutouts with a middle cutout juxtaposed therebetween having an axis aligned with the neutral axis of said bumper beam, said cutouts forming webs therebetween extending in a direction generally intersecting said frame rail, said cutouts allowing said bumper beam to plastically deform in a front direction in said first section of said bumper beam adjacent said frame rail in a crash in said front end of said bumper beam.

* * * * *